United States Patent
Bond et al.

(10) Patent No.: US 7,079,553 B2
(45) Date of Patent: Jul. 18, 2006

(54) METHOD AND SYSTEM FOR EMBEDDING A FIRST CLOCK SIGNAL PHASE WITHIN A SECOND SIGNAL

(75) Inventors: John H. Bond, Plano, TX (US); Robert S. Gammenthaler, Jr., Frisco, TX (US); James C. McKinley, Frisco, TX (US)

(73) Assignee: Alcatel, Paris (FR)

( * ) Notice: Subject to any disclaimer, the term of this patent is extended or adjusted under 35 U.S.C. 154(b) by 1002 days.

(21) Appl. No.: 10/122,506

(22) Filed: Apr. 15, 2002

(65) Prior Publication Data

US 2003/0193968 A1 Oct. 16, 2003

(51) Int. Cl.
*H04J 3/07* (2006.01)

(52) U.S. Cl. .................................. 370/506; 370/518
(58) Field of Classification Search ................ 370/470, 370/471, 503, 504, 505, 506, 509, 510, 512, 370/518, 516

See application file for complete search history.

(56) References Cited

U.S. PATENT DOCUMENTS

| | | | |
|---|---|---|---|
| 5,812,618 A | 9/1998 | Muntz et al. | |
| 5,896,427 A | 4/1999 | Muntz et al. | |
| 6,072,810 A | * 6/2000 | Van der Putten et al. ... | 370/503 |
| 6,128,025 A | * 10/2000 | Bright et al. ............... | 345/504 |

* cited by examiner

*Primary Examiner*—Brenda Pham
(74) *Attorney, Agent, or Firm*—Danamraj & Youst; Craig A. Hoersten; V. Lawrence Sewell

(57) ABSTRACT

A technique for embedding a first clock phase within a second signal is described. In one embodiment, the invention comprises a method of embedding a phase of a first signal within a second signal comprising the steps of monitoring a first signal for a frame event, responsive to detection of a frame event in the first clock signal, determining a position of the frame event relative to a current segment of a second signal, and embedding in the current segment of the second signal a value representative of the relative position of the detected frame event.

21 Claims, 3 Drawing Sheets

METHOD AND SYSTEM FOR EMBEDDING A FIRST CLOCK SIGNAL PHASE WITHIN A SECOND SIGNAL

CROSS-REFERENCE TO RELATED APPLICATION(S)

This application discloses subject matter related to the subject matter disclosed in the following commonly owned, co-pending patent applications, which are hereby incorporated by reference in their entireties: (1) U.S. patent application Ser. No. 09/540,308, entitled "METHOD AND APPARATUS FOR ROUTING ALARM SIGNALS IN A SIGNALING SERVER", filed Mar. 31, 2000 in the name(s) of: Val Teodorescu;(2) U.S. patent application Ser. No. 09/541,000, entitled "CLOCK DISTRIBUTION SCHEME IN A SIGNALING SERVER", filed _Mar. 31, 2000 in the name(s) of: Val Teodorescu; (3) U.S. patent application Ser. No. 09/540,591, entitled "BUS CONTROL MODULE FOR A MULTI-STAGE CLOCK DISTRIBUTION SCHEME IN A SIGNALING SERVER", filed _Mar. 31, 2000 in the name(s) of: Serge Fourcand, Curt McKinley, and Val Teodorescu; (4) U.S. patent application Ser. No. 10/122,461, entitled "DS0 TIMING SOURCE TRANSIENT COMPENSATION", filed Apr. 15, 2002 in the name(s) of: Matthew J. Marcoux and Robert S. Gammenthaler, Jr.; and (5) U.S. patent application Ser. No. 09/539,362, entitled "METHOD AND SYSTEM FOR GENERATING A TIMING SIGNAL", filed Mar. 31, 2000 in the name(s) of: John Bond and Val Teodorescu.

BACKGROUND OF THE INVENTION

1. Technical Field of the Invention

The present invention generally relates to signaling server timing distribution. More particularly, and not by way of any limitation, the present invention is directed to a method and system for embedding the phase of a first clock signal within a second signal.

2. Description of Related Art

Out-of-band signaling establishes a separate channel for the exchange of signaling information between call component nodes in order to set up, maintain, and service a call in a telecommunications network. Such channels, called signaling links, are used to carry all of the necessary signaling messages between the nodes. Thus, for example, when a call is placed, the dialed digits, trunk selected, and other pertinent information are sent between network switches using their signaling links, rather than the trunks that will ultimately carry the bearer traffic.

Out-of-band signaling has several advantages that make it more desirable than traditional in-band signaling. First, it allows for the transport of more data at higher speeds than multi-frequency ("MF") outpulsing used in the telecommunications networks of yore. Also, because of separate trunks and links, signaling can be performed at any time during the duration of the call, not just at the beginning. Furthermore, out-of-band signaling enables signaling to network elements to which there is no direct trunk connection.

SS7 packet signaling has become the out-of-band signaling scheme of choice between telecommunications networks and between network elements worldwide. Three essential components are defined in a signaling network based on SS7 architecture. Signal Switching Points ("SSPs") are basically telephone switches equipped with SS7-capable software that terminate signaling links. They generally originate, terminate, or switch calls. Signal Transfer Points ("STPs") are the packet switches of the SS7 network. In addition to certain specialized functions, they receive and route incoming signaling messages toward their proper destination. Finally, Signal Control Points ("SCPs") are databases that provide information necessary for advanced call processing and Service Logic execution.

As is well known, SS7 signaling architecture is governed by several multi-layered protocols standardized under the American National Standards Institute ("ANSI") and the International Telecommunications Union ("ITU") to operate as the common "glue" that binds the ubiquitous autonomous networks together so as to provide a "one network" feel that telephone subscribers have come to expect.

The exponential increase in the number of local telephone lines, mobile subscribers, pagers, fax machines, and other data devices (e.g., computers, information appliances, etc.), coupled with deregulation that is occurring worldwide today is driving demand for small form factor, high capacity STPs that must be easy to maintain, provide full SS7 functionality with so-called "five nines" operational availability (i.e., 99.999% uptime) and provide the capability to support future functionality or features as the need arises. Further, as the subscriber demand for more service options proliferates, an evolution is taking place to integrate Intelligent Network ("IN") capable SCP functionality within STP nodes.

While it is generally expected that a signal platform that supports large database/high transaction IN services as well as high capacity packet switching (hereinafter referred to as a "signaling server platform") will reduce equipment costs, network facility costs, and other associated costs, while increasing economic efficiency, those skilled in the art will readily recognize that several difficulties must be overcome in order to integrate the requisite functionalities into a suitable network element that satisfies the stringent performance criteria required of telecommunications equipment. Daunting challenges arise in designing a compact enough form factor that is efficiently scalable, ruggedized, and modularized for easy maintenance, yet must house an extraordinary constellation of complex electronic circuitry, e.g., processors, control components, timing modules, I/O devices, line interface cards that couple to telecommunications networks, etc., that is typically required for achieving the necessary network element functionality. Whereas the electronic components may themselves be miniaturized and modularized into cards or boards, interconnecting a large number of such cards via suitable bus systems and controlling such interconnected systems poses many obstacles, especially in light of the stringent form factor requirements of the state-of-the-art equipment.

In addition, beyond the physical difficulties relating to maintenance, card replacement and repair, etc., providing tightly controlled internal clock signals (i.e., telecommunications clocks) in a reliable manner to the cards for synchronization (which is an essential aspect of the operation of a telecommunications switching/routing device) becomes a formidable task in the state-of-the-art solutions when a highly scalable architecture is required.

It should therefore be appreciated that the increasing growth of telecommunications networks has led to the demand for an improved method and system for distributing signals in a telecommunications network. Telecommunication systems distribute signals through a network to control and monitor the modules of the network. Signals distributed downstream include control commands for the downstream modules, while signals collected from the downstream modules include information about the status of the downstream modules. Telecommunications systems also distribute timing signals to synchronize the signals of a network. Telecommunication systems transmit high-speed data and therefore require dependable timing signals.

For error-free transfer of DS0 data between two telecommunications devices located at a site, industry standards require that the data transmission circuitry of each device use a raw, unfiltered, 64 KHz composite clock signal from a building integrated timing source ("BITS") to define the data bit edges. Since each DS0 device uses this clock to recover data received from other DS0 devices, each DS0 device's transmit data must be appropriately aligned to the composite clock's 8 KHz frame. Furthermore, the device's central clock must not filter the composite clock wander and transients, but must follow them so that clock-to-data skew is minimized at the devices. On the other hand, if this same unfiltered clock signal is used to transmit data to or operate non-DS0 circuitry within other devices, the erratic nature of the composite clock can cause timing hazards and corrupt data in those circuits.

It is possible that a single system will include circuitry having different timing requirements. For example, a signaling server such as that described in above-referenced, commonly-assigned U.S. patent application Ser. No. 09/541,000, entitled "CLOCK DISTRIBUTION SCHEME IN A SIGNALING SERVER", may accommodate both phase-dependent (e.g., DS0) links as well as non-phase-dependent (e.g., DS1, T-1, SONET) links. This can be accomplished by providing within the system two separate timing distribution mechanisms, one for the phase-dependent links and an other for the non-phase-dependent links. Such duplication clearly adds complexity both to cabling and circuitry requirements of the system, as well as increasing the associated software overhead involved in configuring and monitoring the timing distribution mechanism. Moreover, increasingly stringent space-limitations on system packaging standards require that the number of signals and cables in a system be minimized.

Accordingly, it would be desirable to implement a single timing distribution mechanism to distribute clock signals throughout the entire system. The prior art provides no means by which to accomplish this.

SUMMARY OF THE INVENTION

The present invention is directed to a technique for embedding a first clock phase within a second signal. In one embodiment, the invention comprises a method of embedding a phase of a first signal within a second signal comprising the steps of monitoring a first signal for a frame event, responsive to detection of a frame event in the first clock signal, determining a position of the frame event relative to a current segment of a second signal, and embedding in the current segment of the second signal a value representative of the relative position of the detected frame event.

In another aspect, the invention is directed to a system for embedding a phase of a first signal within a second signal comprising a timing source for providing a system timing reference signal and a system timing generator ("STG") connected to the timing source to receive the system timing reference signal. The STG comprises a filter for filtering the system timing reference signal and generating a filtered clock signal therefrom and an encoder for generating a framed control signal. Responsive to detection of a frame event in the system timing reference signal, the encoder determines a position of the frame event relative to a current segment of the framed control signal and embeds in the current segment of the framed control signal a value representative of the relative position of the detected frame event.

In yet another aspect, the invention is directed to a system for embedding a phase of a first signal within a second signal comprising means for monitoring a first signal for a frame event, means responsive to detection of a frame event in the first clock signal for determining a position of the frame event relative to a current segment of a second signal, and means for embedding in the current segment of the second signal a value representative of the relative position of the detected frame event.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
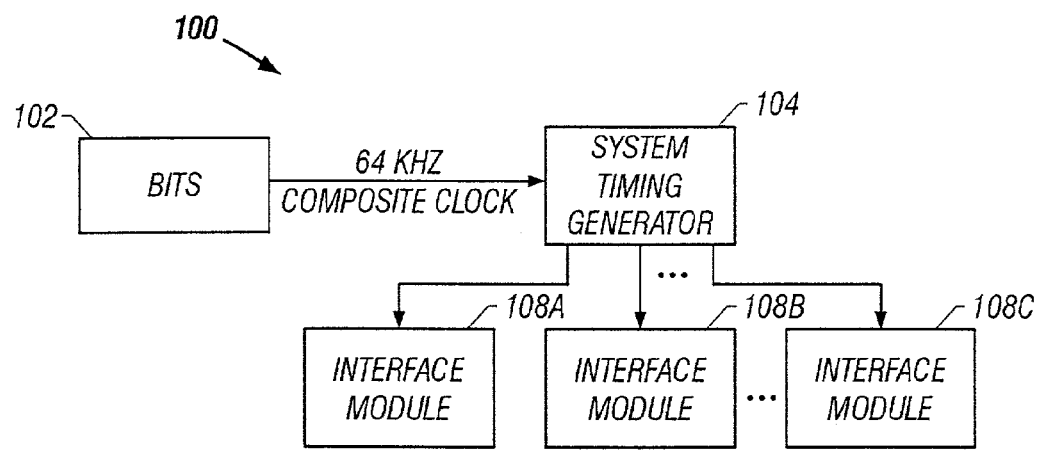
FIG. 1 is a high level functional block diagram of a system in accordance with one embodiment of the invention for embedding the phase of one clock signal within another signal.

In the drawings, like or similar elements are designated with identical reference numerals throughout the several views thereof, and the various elements depicted are not necessarily drawn to scale.

FIG. 1 is a high level block diagram of a system 100 in accordance with one embodiment of the invention for embedding the phase of one clock signal within another signal. A building integrated timing source 102 provides a reference signal, for example, a 64 KHz composite clock signal, to a system timing generator ("STG") 104. As will be described in greater detail below, the STG 104 generates and distributes a set of filtered clock signals to be used as the general purpose clock within telecommunications equipment, represented in FIG. 1 by data transmission modules 108A–108C, located at the site. In a preferred embodiment, the modules 108A–108C comprise telecommunications interface modules. It will be assumed that one of the modules, e.g., module 108A, is a DS0 interface module, while the others (e.g., modules 108B and 108C) are non-DS0 (e.g., DS1 or E1) interface modules.

As will be recognized by one of ordinary skill in the art, the module 108A will have different timing requirements than those of the modules 108B, 108C; namely, data transmitted via the module 108A is required to follow the composite clock, while the modules 108B and 108C require a highly filtered clock in order to function properly.

Figure 2:
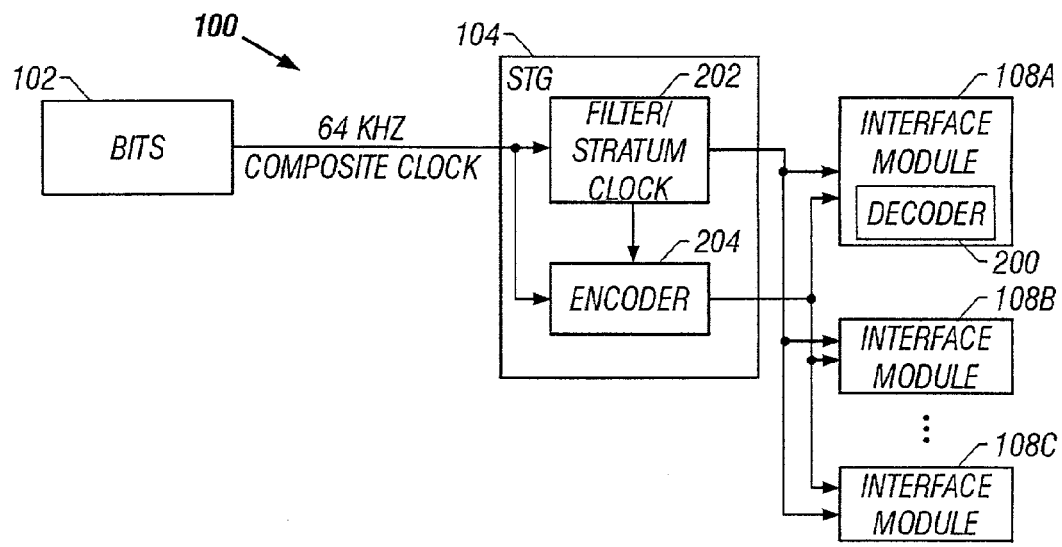
FIG. 2 is a more detailed functional block diagram of the system of FIG. 1 for embedding the phase of a first clock signal within a second signal.

FIG. 2 is a more detailed block diagram of the system 100 for embedding the phase of a first clock signal within a second signal. In a particular embodiment, the first clock signal is the 64 KHz composite clock signal generated by the BITS 102.

Figure 3:
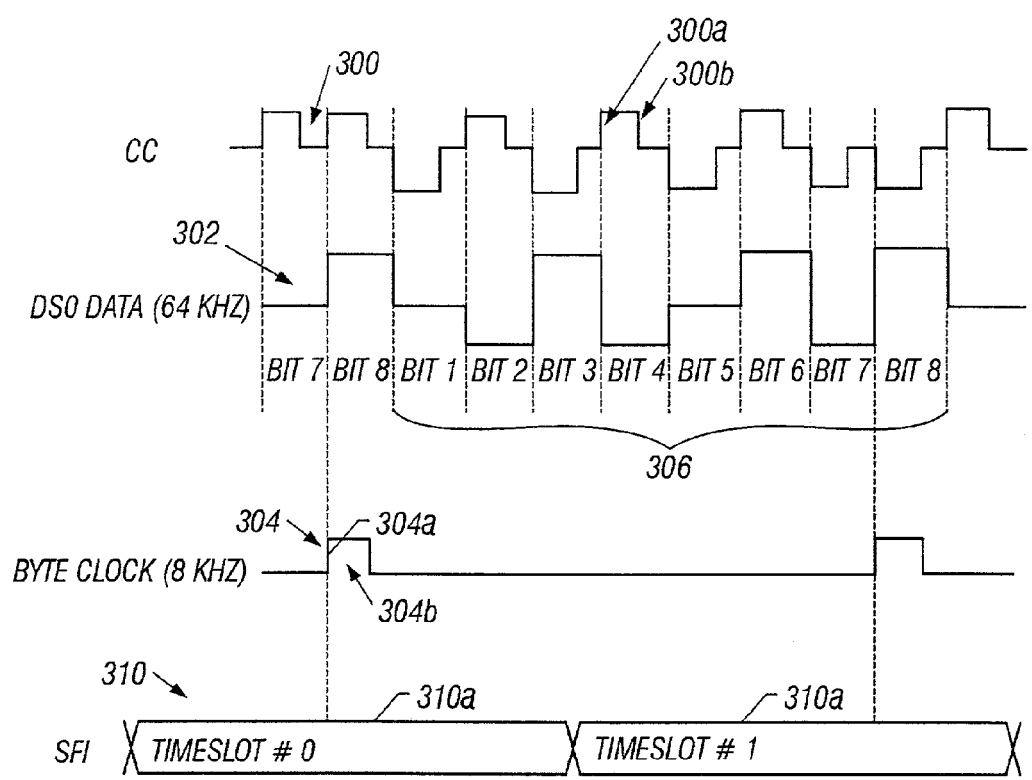
FIG. 3 illustrates waveforms of signals relevant to the system of FIG. 1 for embedding the phase of a first clock signal within a second signal.

FIG. 3 illustrates waveforms of signals relevant to the present invention for embedding the phase of a first clock signal within a second signal. In FIG. 3, a waveform 300 represents the 64 KHz composite clock ("CC") signal generated by the BITS 102 (FIG. 1). Each bit of DS0 data, represented by a waveform 302, is clocked out on a first edge 300a of the composite clock 300 and sampled on a second edge 300b. A waveform 304 represents an 8 KHz byte clock. A rising edge 304a of a pulse 304b of the 8 KHz byte clock is referred to as a "composite clock frame event" and defines the 8 KHz frame position of the 64 KHz composite clock. The bit of DS0 data 302 clocked out after the 8 KHz frame position 304a comprises the beginning of a byte, or 8-bit frame, 306 of DS0 data.

Referring again to FIG. 2, in one embodiment, a filter/stratum clock 202 performs Stratum 3 filtering on the composite clock received from the BITS 102 such that any perturbations to the composite clock are held within limits acceptable to DS1 or E1 links, for example. One of the clock signals generated by the filter/clock 202 is a highly stable 19.44 MHz clock signal. The 19.44 MHz clock signal is input to an encoder 204 along with the unfiltered 64 KHz composite clock from the BITS 102. The encoder 204 uses the two signals to generate a framed control signal, referred to herein as a Super Frame Indicator ("SFI") signal, in accordance with features of the present invention. A waveform representing the SFI signal is illustrated in FIG. 3 and designated by a reference numeral 310.

The SFI signal 310 is a serially encoded framed control signal comprising a plurality of fields for controlling the proper distribution of clock signals and for transmitting commands to system modules. Accordingly, the SFI signal 310 comprises timing and control information addressed to the individual modules (e.g., modules 108A–108C (FIG. 1)) of the particular system (e.g., system 100 (FIG. 1). The SFI signal 310 comprises timeslots, or segments 310a, wherein each segment is assigned to a module. Each segment has a header, which may comprise a six-bit synchronization word. In order to provide synchronization, bits of the segment excluding the header may be repeated twice, so a module receiving the signal may synchronize itself by evaluating the synchronization word of the SFI signal 310. The SFI signal 310 may include a phase of a timing signal, for example, a composite clock signal.

In a preferred embodiment, each segment 310a of the SFI signal comprises 2430 bits, or counts, clocked at the 19.44 MHz clock rate and thus is 125 μs long. A designated field of each segment 310a is used to store a composite clock frame position pointer ("CCFPP"), which identifies the position of a composite clock frame event 304a relative to the SFI signal 310 within that segment 310a. Specifically, the CCFPP is a binary number representing the real-time position of the composite clock frame event 304a relative to the SFI signal 310. The value of the binary number equals the SFI bit count that is most closely aligned with the composite clock frame event 304a. The value of the CCFPP is recalculated for each 125 μs SFI segment 310a.

Referring again to FIGS. 2 and 3, in operation, the encoder 204 detects the occurrence of a composite clock frame event 304a and determines where in the current SFI segment 310a the event occurred; that is, at which "count" of the 2,430 counts of the current SFI segment 310a. This binary value is stored in the CCFPP field of the SFI signal 310. In this manner, the phase of the 64 KHz clock relative to the 19.44 MHz clock is encoded in the SFI signal 310.

The SFI signal 310 and 19.44 MHz signals are then provided to the interface modules 108A–108C. As best shown in FIG. 2, each module comprising a DS0 device, such as the module 108A, is equipped with a decoder 206, which receives the SFI signal 310 and the filtered 19.44 MHz clock and uses the CCFPP to regenerate the 8 KHz byte clock and the 64 KHz composite clock for use by the interface module 108A in sending and receiving DS0 data.

Figure 4:
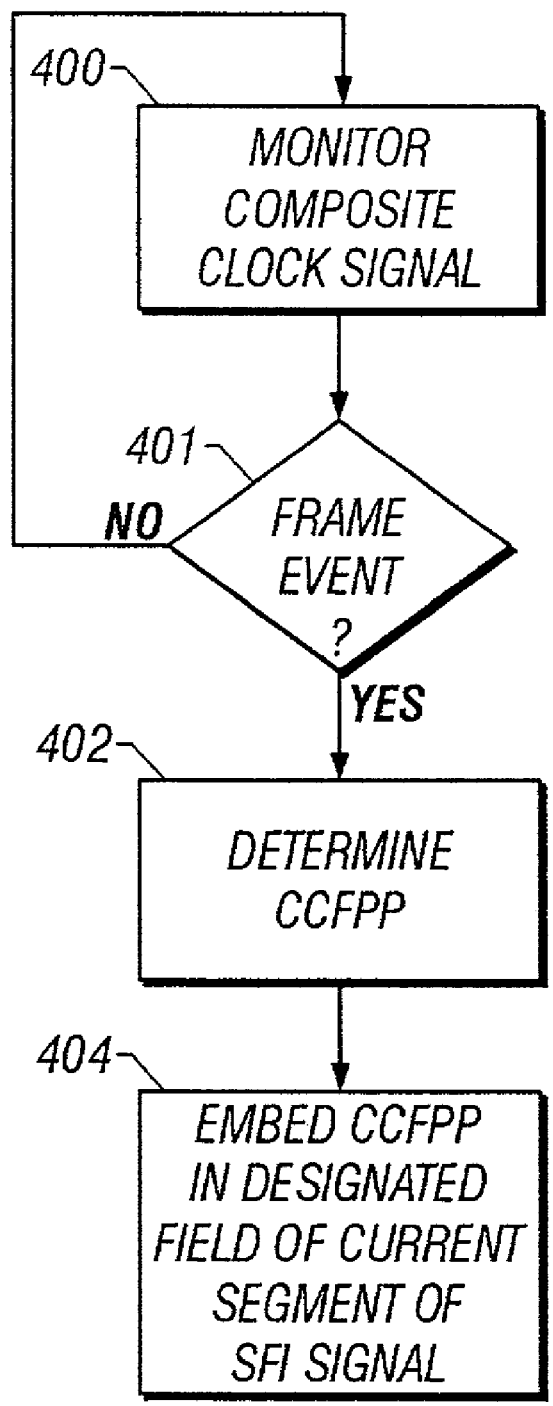
FIG. 4 is a flow diagram of an operation of one embodiment of the system of FIG. 1 for embedding the phase of a first clock signal within a second signal.

FIG. 4 is a flow diagram of a method of operation of the system of FIG. 1 for embedding the phase of a first clock signal within a second signal. Execution begins in steps 400 and 401, in which a first clock signal, e.g., the composite clock signal, is monitored for detection of a frame event. Upon detection of a frame event, execution proceeds to step 402, in which a determination is made as to the position of the frame event relative to the current segment of the SFI signal. In other words, a determination is made as to which bit of the 2430 bits of the SFI signal is most closely aligned with the frame event.

Execution then proceeds to step 404, in which a value representative of the relative position information determined in step 402 is embedded in a selected field in the current SFI segment. In a presently preferred embodiment, the value, referred to as the CCFPP, is stored as a 12-bit binary number in a selected field of the SFI segment. Execution then returns to step 400 to await detection of the next frame event.

As described hereinabove, a single STG 104 can thus be used to generate and distribute clock signals to all telecommunications devices at a site, whether those devices are DS0 or non-DS0 devices. Accordingly, embedded within a single set of filtered clock signals that can be used as the general purpose clock for a system is the capability of recreating the raw composite clock signal therefrom. The DS0 data transmission circuits can then utilize this recreated raw composite clock signal so that industry standard timing requirements are met.

Based upon the foregoing Detailed Description, it should be readily apparent that the present invention advantageously provides an innovative and efficient solution for embedding the phase of one clock signal, including transients, within another signal.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A method of embedding a phase of a first signal within a second signal, the method comprising the steps of:
    monitoring a first signal for a frame event;
    responsive to detection of a frame event in the first clock signal, determining a position of the frame event relative to a current segment of a second signal; and
    embedding in the current segment of the second signal a value representative of the relative position of the detected frame event.

2. The method of claim 1 wherein the first signal comprises a composite clock signal.

3. The method of claim 1 wherein the second signal comprises a framed control signal.

4. The method of claim 3 wherein the value representative of the relative position of the detected frame event is stored in a pointer field of the current segment of the framed control signal.

5. The method of claim 1 wherein the first signal comprises a 64 kilohertz clock signal and the second signal comprises a super frame indicator ("SFI") signal.

6. The method of claim 1 wherein the current segment comprises 2430 bits of data and wherein the step of determining the relative position of the frame event comprises determining which of the 2430 bits of the current segment is most closely aligned with the detected frame event.

7. The method of claim 6 wherein value representative of the relative position of the detected frame event comprises a 12-bit binary number identifying which of the bits of the current segment is most closely aligned with the detected frame event.

8. A system for embedding a phase of a first signal within a second signal, the system comprising:
    a timing source for providing a system timing reference signal;
    a system timing generator ("STG") connected to the timing source to receive the system timing reference signal, the STG comprising:
    a filter for filtering the system timing reference signal and generating a filtered clock signal therefrom; and
    an encoder for generating a framed control signal, wherein responsive to detection of a frame event in the system timing reference signal, the encoder determines a position of the frame event relative to a current segment of the framed control signal and embeds in the current segment of the framed control signal a value representative of the relative position of the detected frame event.

9. The system of claim 8 wherein the value representative of the relative position of the detected frame event is stored in a pointer field of the current segment of the framed control signal.

10. The system of claim 8 wherein the system timing reference signal comprises a 64 kilohertz clock signal and the framed control signal comprises a super frame indicator ("SFI") signal.

11. The system of claim 8 wherein the current segment comprises 2430 bits of data and wherein the step of determining the relative position of the frame event comprises determining which of the 2430 bits of the current segment is most closely aligned with the detected frame event.

12. The system of claim 11 wherein value representative of the relative position of the detected frame event comprises a 12-bit binary number identifying which of the bits of the current segment is most closely aligned with the detected frame event.

13. The system of claim 8 further comprising a telecommunications interface module connected to receive the framed control signal and the filtered clock signal from the STG.

14. The system of claim 13 wherein the telecommunications interface module is a DS0 interface module and the system timing reference signal comprises a 64 kilohertz composite clock signal and wherein the DS0 interface module comprises a decoder for reconstructing the 64 kilohertz composite clock signal from the received framed control signal and filtered clock signal.

15. A system for embedding a phase of a first signal within a second signal, the system comprising:
    means for monitoring a first signal for a frame event;
    means responsive to detection of a frame event in the first clock signal for determining a position of the frame event relative to a current segment of a second signal; and
    means for embedding in the current segment of the second signal a value representative of the relative position of the detected frame event.

16. The system of claim 15 wherein the first signal comprises a composite clock signal.

17. The system of claim 15 wherein the second signal comprises a framed control signal.

18. The system of claim 17 wherein the value representative of the relative position of the detected frame event is stored in a pointer field of the current segment of the framed control signal.

19. The system of claim 15 wherein the first signal comprises a 64 kilohertz clock signal and the second signal comprises a super frame indicator ("SFI") signal.

20. The system of claim 15 wherein the current segment comprises 2430 bits of data and wherein the means for determining the relative position of the frame event comprises means for determining which of the 2430 bits of the current segment is most closely aligned with the detected frame event.

21. The system of claim 20 wherein value representative of the relative position of the detected frame event comprises a 12-bit binary number identifying which of the bits of the current segment is most closely aligned with the detected frame event.

* * * * *